United States Patent [19]

Schnizler, Jr. et al.

[11] 3,948,534
[45] Apr. 6, 1976

[54] CHUCK FOR HAMMERDRILLS AND THE LIKE

[75] Inventors: Albrecht Schnizler, Jr.; Walter Hilburger, both of Nurtingen, Germany

[73] Assignee: Metabowerke KG Closs, Rauch & Schnizler, Nurtingen, Germany

[22] Filed: July 11, 1974

[21] Appl. No.: 487,811

[30] Foreign Application Priority Data

July 14, 1973 Germany............................ 2335865

[52] U.S. Cl. .................................................. 279/62
[51] Int. Cl.² ......................................... B23B 31/12
[58] Field of Search .............. 279/61, 62, 19, 60, 64

[56] References Cited
UNITED STATES PATENTS

| 1,343,795 | 6/1920 | Smith | 279/60 X |
| 1,473,488 | 11/1923 | McConnell | 279/62 |
| 1,495,233 | 5/1924 | McConnell | 279/62 |
| 3,807,745 | 4/1974 | Bent | 279/62 X |

Primary Examiner—Othell M. Simpson
Assistant Examiner—Leon Gilden
Attorney, Agent, or Firm—Michael J. Striker

[57] ABSTRACT

A chuck body has one end for connection to a power tool, and another end from which a plurality of jaws project. A sleeve turnably surrounds the body and jaws and is operative, when turned in one direction, for moving the jaws inwardly towards one another into engagement with a tool bit that is located between them. A plate spring is mounted at the one end of the body and has a circumferential marginal portion which engages and frictionally locks the sleeve when the latter is turned in the aforementioned one direction.

10 Claims, 1 Drawing Figure

U.S. Patent April 6, 1976 3,948,534
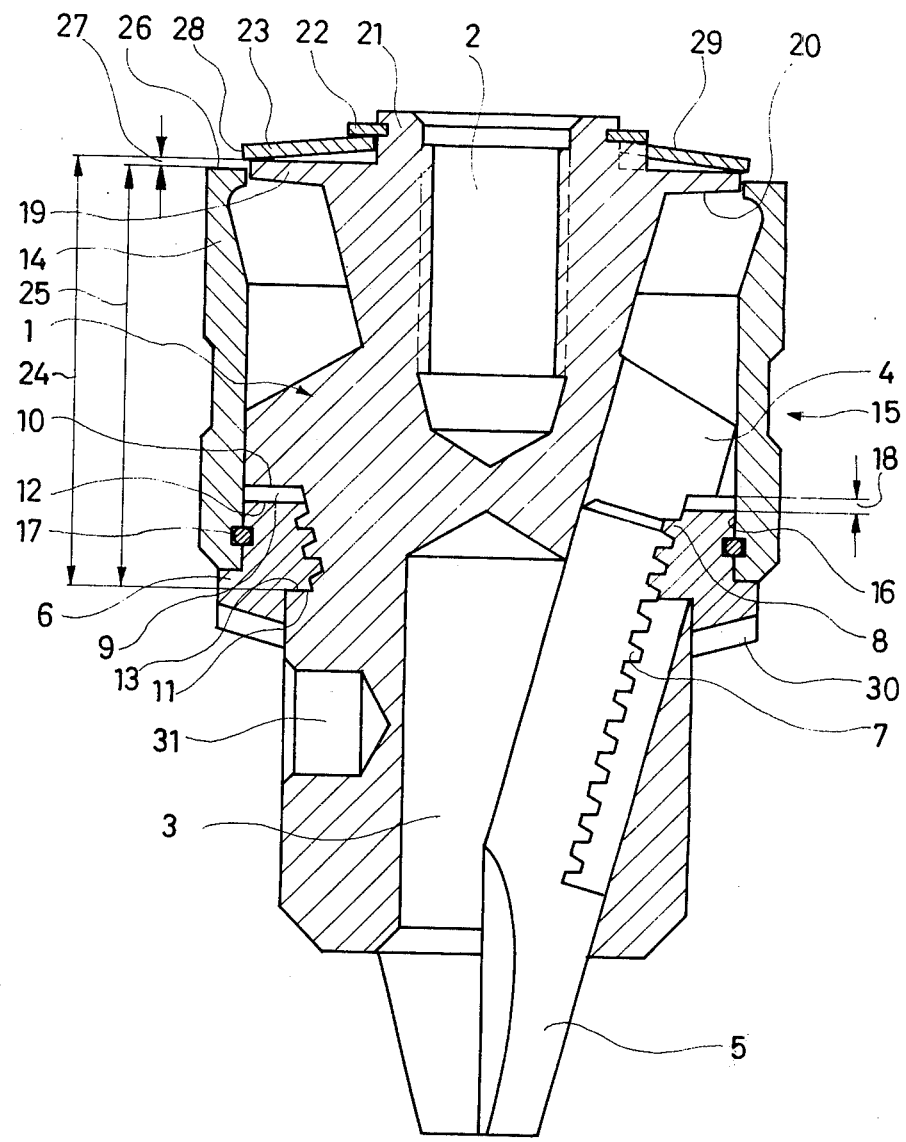

CHUCK FOR HAMMERDRILLS AND THE LIKE

BACKGROUND OF THE INVENTION

The present invention relates generally to a chuck, and more particularly to a chuck which is especially suitable for use in hammerdrills and the like.

Many different types of chucks for use in power tools are already known. The purpose of these chucks is to engage a tool bit between the jaws of the chuck, and to hold it so that it can rotate or otherwise move with the spindle of the power tool on which the chuck is mounted. All of these chucks have some type of arrangement which is to prevent the undesired loosening of the jaws from the tool bit, and this is usually done by friction. For example, it is known to provide rubber or other elastomeric elements which are located between and in frictional engagement with the body of the chuck and the turnable sleeve which surrounds the chuck body and which effects the movement of the jaws axially and radially into and out of engagement with the tool bit. The purpose of these elastomeric elements is to create increased friction between the turnable sleeve and the chuck body, so as to prevent undersired turning of the sleeve and thus loosening of the jaws from the tool bit.

In certain applications, however, the prior-art arrangements for preventing loosening are not effective enough. This is particularly true in the case of chucks used in hammerdrills and the like, where the impact energy of a single impact is so great that the prior-art arrangement will not satisfactorily prevent the undesired loosening. Attempts have been made to simply increase the friction exerted by the prior-art arrangements, but it has been found that this makes the operation of the chuck in a sense opening or closing the jaws so difficult that the chuck can in effect be adjusted —to open it or to close it— only by means of a special key, which is often undersirable.

SUMMARY OF THE INVENTION

It is therefore a general object of this invention to overcome the aforementioned disadvantages of the prior art.

More particularly, it is an object of the invention to provide an improved chuck which is especially suitable for use in hammerdrills and the like, and which avoids the aforementioned disadvantages.

In particular, it is an object of the invention to provide such a chuck which can be readily adjusted between the open and closed positions thereof, but which will reliably prevent loosening of the engagement of the jaws with a tool bit under all operating conditions.

In keeping with these objects, and with others which will become apparent hereafter, one feature of the invention resides in a chuck for hammerdrills and the like which, briefly stated, comprises a chuck body having one end for connection to a power tool, and another end, and a plurality of jaws on the chuck body and projecting beyond the other end for engaging and holding a tool bit. A sleeve turnably surrounds the body and jaws and is operative, when turned in one direction, for moving the jaws inwardly towards one another into engagement with a tool bit that is located between them. A plate spring is mounted at the one end of the body and has a circumferential marginal portion which engages and frictionally locks the sleeve when the latter is turned in the one direction until the jaws engage the tool bit.

The sleeve of course shifts in direction axially of the body, but only at the end of the tool bit engaging operation, that is after it has already caused the jaws to engage the tool bit and is being further turned in order to tightly urge the jaws against the tool bit. Only during this last part will the sleeve become displaced axially, and only in this part will it then be frictionally locked by the plate spring. This locking prevents loosening under all circumstances, because the friction between the plate spring and the sleeve is particularly great, due to the fact that the frictional engagement takes place at the outer circumferentail margin of the plate spring where the latter has the greatest radius.

Having the plate spring located at that end of the chuck body which is connected with the tool spindle has the advantage of preventing significant axial displacement of the sleeve; such displacements —which can occur in the event of an undesired loosening— might lead to significant damage of the equipment and might also represent a danger of injury to a user or bystander.

In order to prevent the plate spring from turning with respect to the chuck body itself, due to the fact that there is a relatively low frictional moment between the plate spring and the chuck body, the plate spring is fixed to the chuck body against rotation relative thereto, for instance by providing a projection extending into a recess, by using a pin or the like, or in any other suitable manner.

Because the jaws are inclined to the longitudinal axis of the sleeve and the chuck body, the annulus of gear teeth provided in the interior of the sleeve requires a conical thread. This limits the axial displacement of the sleeve and annulus unit, to the maximum possible play in the teeth. In order to obtain the smallest possible axial displacement, the plate spring can be mounted in pretensioned condition on the chuck body. In order to still obtain a ready turning of the sleeve without having to overcome excessive frictional force even within such an embodiment, the plate spring may engage an outer edge of the chuck body, and can be deformed and lifted off this outer edge by engagement with the sleeve. It is advantageous in this case to provide a certain amount of limited axial play between the sleeve and the plate spring when the latter is not being stressed by engagement with the sleeve.

The novel features which are considered as characteristic for the invention are set forth in partiuclar in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is an axial section through a chuck according to the present invention, wherein the plate spring is shown in non-stressed condition.

DESCRIPTION OF THE PREFFERED EMBODIMENTS

Referring to the drawing in detail it will be seen that reference numeral 1 identifies a body of the illustrated chuck, having at its upper end a blind bore 2 by means of which the chuck body can be mounted on a (not illustrated) tool spindle of a tool, for instance a hammerdrill or the like. The opposite lower end of the body 1 is provided with a second blind bore 3 into which a shank of a (not illustrated) tool bit can be inserted. To hold the tool bit in place, the chuck body 1 is provided with three bores 4 which are inclined and are circumferentially offset with reference to one another by 120° to each. Each of the bores 4 accommodates a jaw 5 which can be shifted longitudinally by means of an annulus 6 of gear teeth. The jaws are provided with a thread 7 which meshes with a thread 8 of the annulus of gear teeth 6. Because of the inclination of the bores 4, the thread 8 is formed on a conical surface of the annulus 6, which latter is guided in a circumferential groove 9 formed in the body 1 intermediate axially abutments 10 and 11. The annulus is formed with abutment faces 12 and 13 which are axially spaced and which cooperate with the abutment faces 10 and 11, respectively. The annulus 6 is advantageously made of two parts, in order to simplify its installation; it is of suitably hardened material, such as steel, and is fixedly connected with a turnable adjusting sleeve 14, so as to form a unit 15 therewith after the two components have been installed. For this purpose the sleeve 14 is press-fitted onto a portion 16 of the annulus 6, and the two are rigidly connected, for instance by injecting a hardenable synthetic plastic resin into a groove 17 which is partly formed in each of the annulus 6 and the sleeve 14.

The annulus 6 has a certain amount of axial play, identified with reference numeral 18, in the groove 9. The end of the sleeve 14 which faces towards the end of the body 1 whereat the spindle is to be connected, is guided in axial direction on a flange 19 which forms a lateral abutment edge or margin 20 for a plate spring 23 which is mounted on the end 21 of the body 1 by means of a retaining ring 22.

To assure that the unit 15 can be turned easily and without having to overcome any significant friction, the spacing 24 between the abutment face 11 and the edge 20 is greater than the spacing 25 between the abutment face 13 and the upper end face 26 of the sleeve 14. Reference numeral 27 identifies the amount of play between the upper end face 26 of the sleeve 14 and the abutment edge 20; this is substantially smaller than the amount of play 18 which is afforded the annulus 6 in the groove 9.

When a tool bit is to be held in the chuck, the jaws 5 are shifted downwardly in the drawing, by turning the unit 15 so that the threads 7 and 8 cooperate with one another. This continues until the jaws 5 engage the shank of the tool bit. Thereafter, the jaws can no longer move downwardly and, when the unit 15 continues to be turned, this results in a threading of the annulus 6 in upward direction, so that the upper end face 26 of the sleeve 14 moves into abutment with the outer circumferentail edge 28 of the plate spring 23, and further turning of the unit 15 causes the sleeve 14 to lift this edge 28 off the abutment edge 20.

Since the plate spring 23 is mounted on the body 1 so that it presses under prestressed conditions against the abutment edge 20, this upward movement of the sleeve 14 results in an increasing pressure of the spring 23 against the end face 26, so that further turning of the sleeve 14 causes a high degree of friction to act between the sleeve 14 and the plate spring 23, thereby assuring that even the heaviest impacts to be expected cannot accidentally and unintentionally loosen the annulus 6 by undesired turning of the sleeve 14.

In order to prevent turning of the plate spring 23 with reference to the body 1, due to the fact that there is relatively small amount of friction between the two, the chuck body 1 is provided in this embodiment with a projection 29 which extends into a corresponding opening of the plate spring 23. Of course, the relationship could be reversed, or a projection having one or two flats could be provided on either the body 1 or the spring 23, and extend into a matingly configurated recess on the respectively other component.

In order to overcome the friction between the spring 23 and the sleeve 14 when the sleeve is either to be tightened or to be loosened, the annulus 6 is provided at one axial end with an annulus of teeth 30 into which a suitable key (not shown) can extend which is inserted into a bore 31 of the body 1, and which serves to turn the annulus 6 and thereby the unit 15, including the sleeve 14.

It will be understood that each of the elements described above, or two or more together, may also find a useful application in other types of constructions differing from the types described above.

While the invention has been illustrated and described as embodied in a chuck, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A chuck for hammerdrills and the like, comprising a chuck body having an axis, one axial end for connection to a power tool, and another end axially spaced from said one end; a plurality of jaws on said chuck body and projecting axially beyond said other end for engaging and holding a tool bit; a plate spring mounted on said body at said one end thereof and having a circumferential marginal portion; and a sleeve mounted on said body so as to surround the same with freedom of turning movement and limited axial displacement with respect thereto and operative, when turned in one direction, for moving said jaws inwardly towards one another into engagement with a tool bit located between said jaws, said sleeve being axially displaced subsequent to such engagement relative to said body towards said one end thereof into frictional locking contact with said marginal portion of said spring.

2. A chuck as defined in claim 1; and further comprising retaining means for retaining said spring against turning movement relative to said chuck body.

3. A chuck as defined in claim 1, wherein said spring is mounted on said chuck body in prestressed condition.

4. A chuck as defined in claim 1, wherein said chuck body has an outer circumference at said one end, and said marginal portion of said spring overlies and projects outwardly beyond said outer circumference; and wherein said sleeve deflects said spring off said outer circumference.

5. A chuck as defined in claim 1, wherein said plate spring is flat when it is not stressed by engagement with said sleeve.

6. A chuck as defined in claim 1, wherein said sleeve disengages from said spring when the sleeve is turned in a direction opposite to said one direction.

7. A chuck as defined in claim 1, wherein said spring is out of contact with said sleeve until the latter is turned in said one direction to a requisite extent.

8. A chuck for hammerdrills and the like, comprising a chuck body having one end for connection to a power tool and having an outer circumference, and another end; a plurality of jaws on said chuck body and projecting beyond said other end for engaging and holding a tool bit; a plate spring mounted at said one end of said body and having a circumferential marginal portion which overlies and projects outwardly beyond said outer circumference of said one end; and a sleeve turnably surrounding said body and jaws and operative, when turned in one direction, for moving said jaws inwardly towards one another into engagement with a tool bit located between them, and for engaing said marginal portion and deflecting said spring off said outer circumference of said one end to thereby frictionally lock said sleeve upon further turning thereof in said one direction subsequent to the engagement of said jaws with the tool bit.

9. A chuck for hammerdrills and the like, comprising a chuck body having one end for connection to a power tool, and another end, and formed with two axially spaced abutment faces; a plurality of jaws on said chuck body and projecting beyond said other end for engaging and holding a tool bit; a sleeve turnably surrounding said body and jaws and having an interior annulus of gear teeth that is located between said abutment faces, the spacing of one of said abutment faces from the endface of said sleeve which faces toward said one end of said chuck body being smaller than the spacing of the other of said abutment faces from said one end of said chuck body, said sleeve being operative, when turned in one direction, for moving said jaws inwardly towards one another into engagement with a tool bit located between them; and a plate spring mounted at said one end of said body and out of contact with said sleeve until the latter is turned to a requisite extent in said one direction, said spring having a circumferential marginal portion which engages and frictionally locks said sleeve when the latter is further turned in said one direction until said jaws engage said tool bit.

10. A chuck for hammerdrills and the like, comprising a chuck body having one end for the connection to a power tool, and another end, and formed with two axially spaced abutment faces one of which faces toward said one end; a plurality of jaws on said chuck body and projecting beyond said other end for engaging and holding a tool bit; a sleeve turnably surrounding said body and jaws and having an interior annulus of gear teeth that is located between said abutment faces and has an abutment surface facing said one abutment face, the spacing of said abutment surface from the endface of said sleeve which faces toward said one end of said chuck body being smaller than the spacing of said one abutment face from said one end of said chuck body, said sleeve being operative, when turned in one direction, for moving said jaws inwardly towards one another into engagement with a tool bit located between them; and a plate spring mounted at said one end of said body and having a circumferential marginal portion which contacts said one end and is out of contact with said sleeve due to the difference between said spacings until said sleeve is turned in said one direction to an extent requisite for said jaws to engage the tool bit, further turning of said sleeve in said one direction towards a final position thereof resulting in displacement of said sleeve and of said endface towards said one end and into engagement with said marginal portion of said spring whereby said sleeve is frictionally locked in said final position.

* * * * *